(12) United States Patent
Eom

(10) Patent No.: US 7,137,058 B2
(45) Date of Patent: Nov. 14, 2006

(54) BLOCK SYNCHRONIZATION DETECTION APPARATUS AND METHOD

(75) Inventor: Woo-sik Eom, Gyeonggi-dol (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 10/635,000

(22) Filed: Aug. 6, 2003

(65) Prior Publication Data

US 2004/0153882 A1    Aug. 5, 2004

(30) Foreign Application Priority Data

Aug. 22, 2002    (KR)    ............................... 2002-49698

(51) Int. Cl.
*H03M 13/00* (2006.01)
*G11B 3/00* (2006.01)

(52) U.S. Cl. ...................... 714/775; 714/789; 714/798; 369/53.34

(58) Field of Classification Search ................ 714/775, 714/769, 770, 798, 799, 731, 760, 801, 789, 714/752; 369/53.34
See application file for complete search history.

(56) References Cited

U.S. PATENT DOCUMENTS

| | | | | |
|---|---|---|---|---|
| 5,621,734 A * | 4/1997 | Mann et al. ................ 709/227 |
| 6,029,208 A * | 2/2000 | Kim .............................. 710/4 |
| 6,160,777 A * | 12/2000 | Kim ........................ 369/47.36 |
| 6,181,660 B1 * | 1/2001 | Hirayama et al. ......... 369/59.1 |
| 6,519,715 B1 * | 2/2003 | Takashi et al. ............... 714/32 |
| 6,564,352 B1 * | 5/2003 | Furuhashi et al. .......... 714/801 |
| 6,747,942 B1 * | 6/2004 | Tanoue et al. ........... 369/275.3 |
| 6,757,231 B1 * | 6/2004 | Fujiwara .................. 369/53.35 |

\* cited by examiner

*Primary Examiner*—Albert Decady
*Assistant Examiner*—Fritz Alphonse
(74) *Attorney, Agent, or Firm*—Staas & Halsey LLP

(57) ABSTRACT

A block synchronization detection apparatus and method. Block synchronization for discriminating one error correction code (ECC) block from another is detected, even when a first sector of the ECC block is not detected in a system having a decoder that decodes an ECC in units of ECC blocks. The block synchronization detection apparatus includes an operator performing an operation on a predetermined last sector number, an n-th sector number, and an (n−1)-th sector number contained in a block, based on a predetermined operation relation; and a comparator comparing a result of the operation output from the operator with a predetermined threshold value and outputting the result of the comparison as a block synchronization signal.

26 Claims, 7 Drawing Sheets

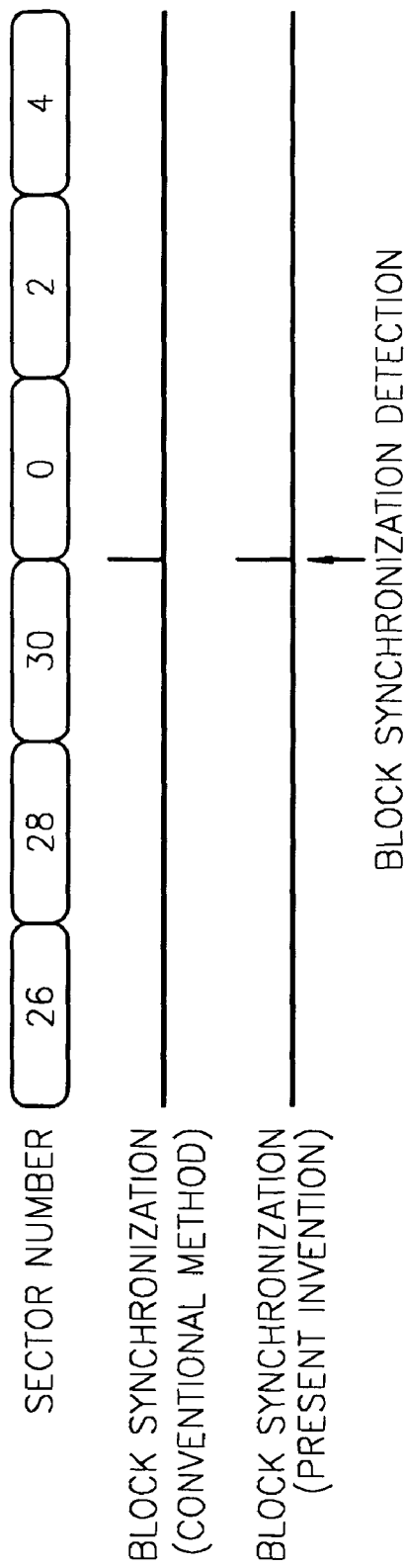
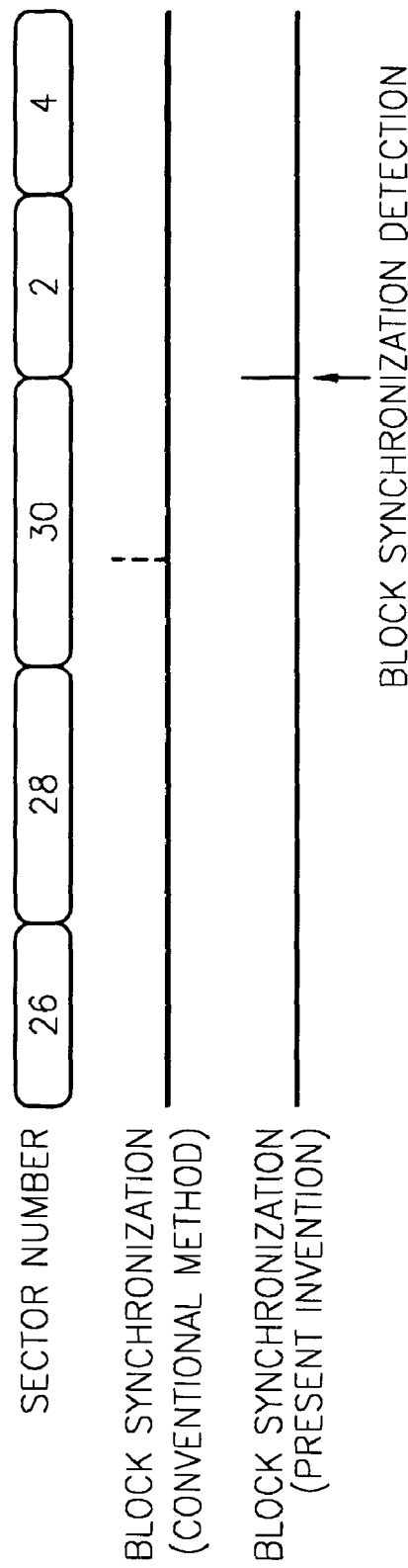

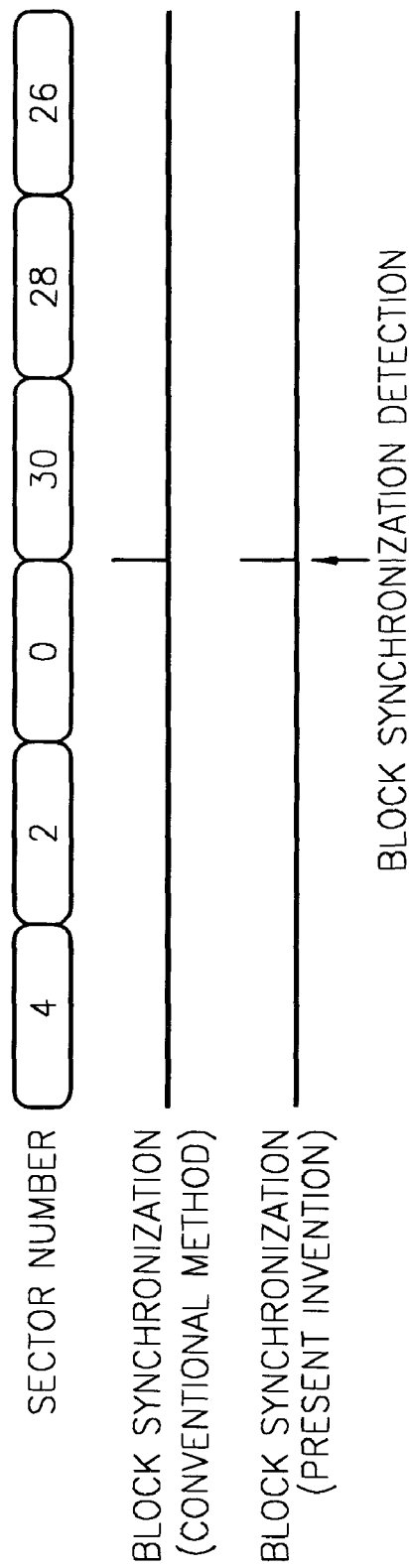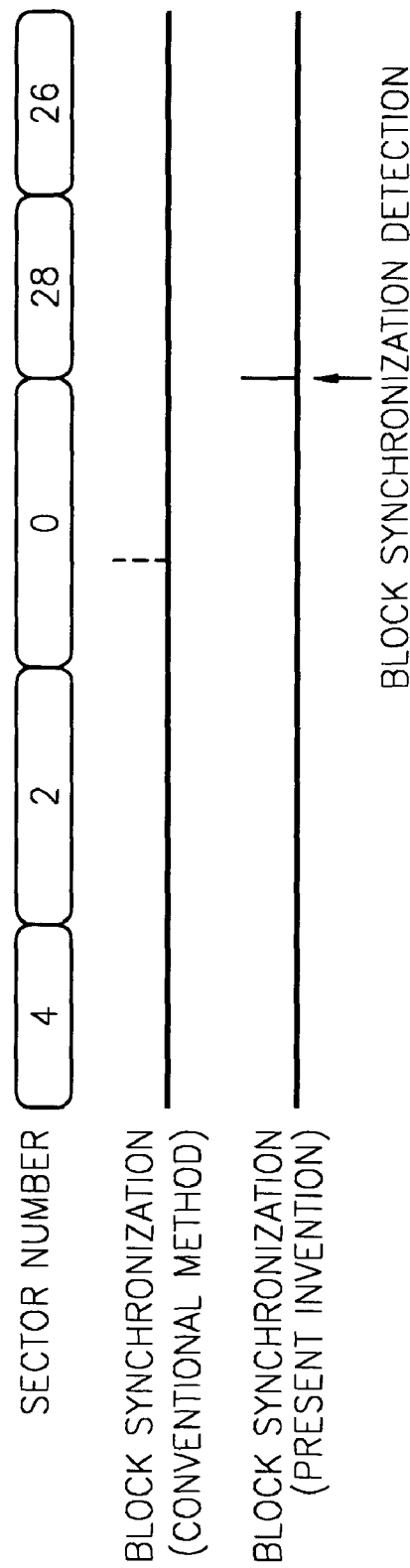

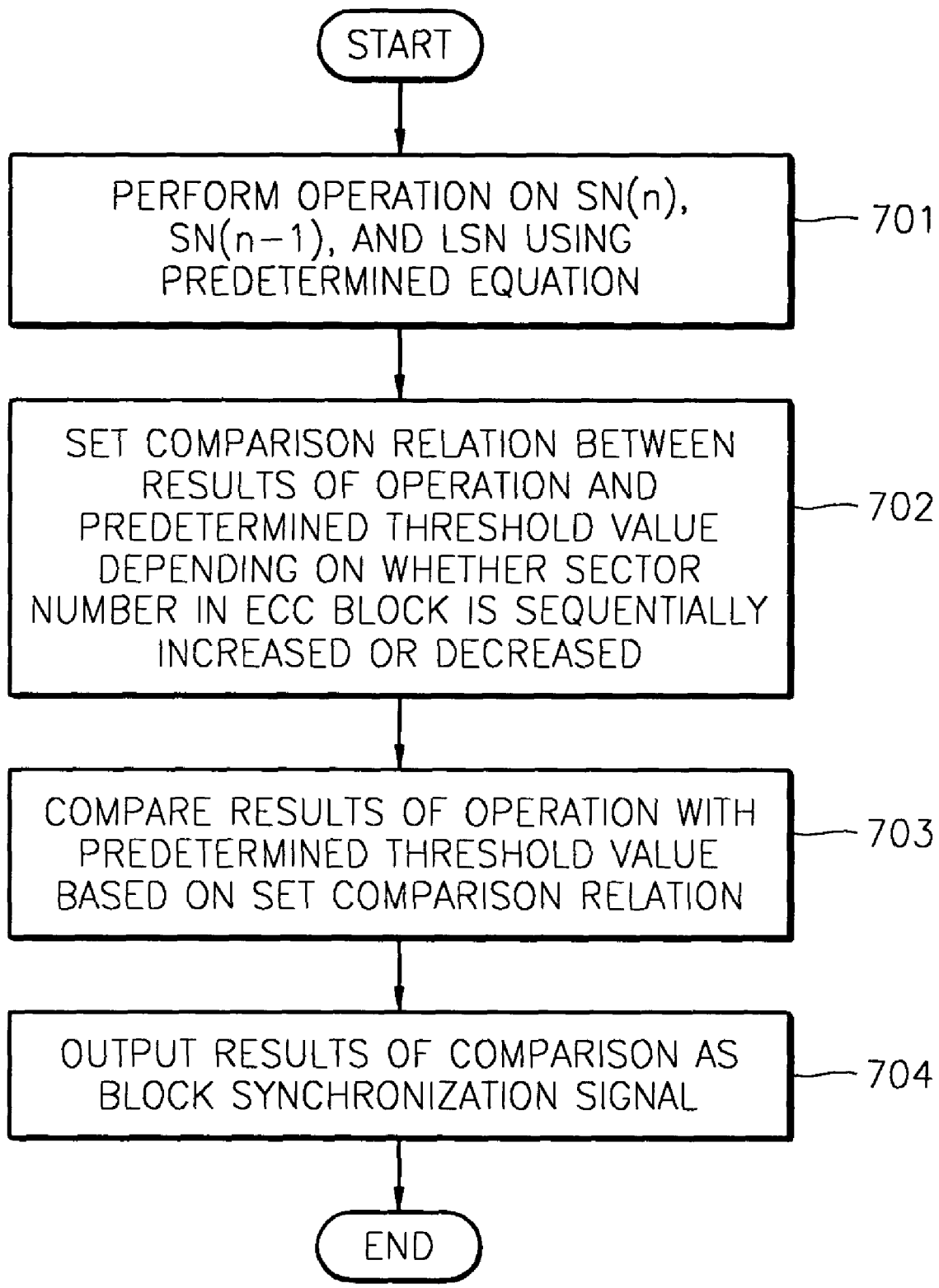

BLOCK SYNCHRONIZATION DETECTION APPARATUS AND METHOD

CROSS-REFERENCE TO RELATED APPLICATIONS

This application claims the priority of Korean Patent Application No. 2002-49698, filed on Aug. 22, 2002, in the Korean Intellectual Property Office, the disclosure of which is incorporated herein in its entirety by reference.

BACKGROUND OF THE INVENTION

1. Field of the Invention

The present invention relates to a block synchronization detection apparatus and method, and, more particularly, to a block synchronization detection apparatus and method for detecting a block synchronization by which an error correction code (ECC) block is discriminated from another ECC block in a system having a decoder for decoding an ECC in units of ECC blocks, each block including a plurality of sectors.

2. Description of the Related Art

Systems having a decoder for decoding an ECC in units of ECC blocks, where each block includes a plurality of sectors, include drivers for driving a disc, such as a DVD-ROM, a DVD-R, a DVD-RW, a DVD+R, a DVD+RW, a DVD-RAM, or a blu-ray disc (BD). Each sector contained in an ECC block is allocated a number so that the sectors can be discriminated from one another. For example, when one ECC block contains 16 sectors and the sector number is sequentially increased from 0, the sectors are numbered as 0, 1, 2, 3, . . . , 14, and 15.

Thus, a decoder of a conventional disc driver performs block synchronization using sector numbers. That is, the conventional decoder detects a sector number of input data and generates a block synchronization detection signal if the detected sector number is a first sector of an ECC block. When one ECC block contains 16 sectors and the sector numbers are sequentially increased from 0, a sector number indicating the first sector of the ECC block is represented as 0 (0000 in the binary number system), and when the sector numbers are sequentially decreased from 15, the sector number indicating the first sector of the ECC block is represented as 15 (1111 in the binary number system).

However, if due to defects of the input data or other reasons, the first sector number of the ECC block is not detected, the conventional decoder cannot detect block synchronization for the currently-input ECC block. For example, when one ECC block contains 16 sectors and a sector number is sequentially increased from 0, if an (n−1)-th sector number is 15 and an n-th sector number is 1, the conventional decoder cannot detect block synchronization.

Block synchronization is used to control a buffer memory for storing data in units of input ECC blocks or to correct data errors. However, if block synchronization of an m-th ECC block cannot be detected, the buffer memory is overwritten with data of the currently input m-th ECC block in a region in which an (m−1)-th ECC block is stored. Thus, errors occur in the number of reproduced ECC blocks such that normal data processing cannot be performed.

In addition, if block synchronization for the m-th ECC block cannot be detected, error correction for the (m−1)-th ECC block is not performed. This is because if block synchronization for the m-th ECC block is detected, error correction for the (m−1)-th ECC block is performed.

SUMMARY OF THE INVENTION

It is an aspect of present invention to provide a block synchronization detection apparatus and method, by which block synchronization for discriminating an error correction code (ECC) block from another one is detected even when a first sector of the ECC block is not detected in a system having a decoder for decoding an ECC in units of ECC blocks.

It is another aspect of present invention to provide a block synchronization detection apparatus and method, by which errors in the number of reproduced ECC blocks is minimized and accurate error correction is performed in a system having a decoder for decoding an ECC in units of ECC blocks.

Additional aspects and/or advantages of the invention will be set forth in part in the description that follows and, in part, will be obvious from the description, or may be learned by practice of the invention.

To achieve the above and/or other aspects of the present invention, there is provided a block synchronization detection apparatus in a system having a decoder that decodes an error correction code (ECC) in units of blocks comprising a plurality of sectors, the apparatus including an operator performing an operation on a predetermined last sector number, an n-th sector number, and an (n−1)-th sector number contained in a block, based on a predetermined operation relation; and a comparator comparing a result of the operation output from the operator with a predetermined threshold value and outputting the result of the comparison as a block synchronization signal.

The comparator compares the result of the operation with the predetermined threshold value based on a comparison relation set depending on whether sector numbers contained in the block are sequentially increasing or decreasing.

If the sector numbers contained in the block are sequentially increasing, the comparator determines whether the result of the operation is smaller than a first predetermined threshold value, and if the sector numbers contained in the block are sequentially decreasing, the comparator determines whether the result of the operation is greater than a second predetermined threshold value.

The operation performed by the operator subtracts the (n−1)-th sector number from the predetermined last sector number, adds the n-th sector number to a result of the subtraction, and outputs a result of the addition.

The apparatus further includes a delay unit that delays the (n−1)-th sector number for one sector duration before providing the (n−1)-th sector number to the operator.

The predetermined threshold value is set to determine block synchronization when errors occur in a plurality of the sector numbers.

The predetermined threshold value is set to determine block synchronization when a first sector number for the block is not detected.

To achieve the above and/or other aspects of the present invention, there is provided a block synchronization detection apparatus in a system having a decoder that decodes an error correction code (ECC) in units of blocks having a plurality of sectors, the apparatus including a first block synchronization detection unit that, when sector numbers contained in a block are sequentially increasing, determines whether a result of an operation using a plurality of the sector numbers contained in the block is smaller than a first predetermined threshold value, and outputs a result of the determination as a block synchronization signal; and a second block synchronization detection unit that, when the sector numbers contained in the block are sequentially decreasing, determines whether a result of an operation using a plurality of the sector numbers contained in the block is greater than a second predetermined threshold value, and outputs a result of the determination as a block synchronization signal.

The first and second predetermined threshold values are set to determine block synchronization when errors occur in a sector in which block synchronization is to be detected and in a plurality of the sector numbers adjacent to the sector in which block synchronization is to be detected.

The first and second predetermined threshold values are set to determine block synchronization when a first sector number for the block is not detected.

The apparatus further includes a delay unit that delays input of one of the sector numbers for one sector duration.

The plurality of sector numbers contained in the block comprise an n-th sector number, a (n−1)-th sector number provided by the delay unit, and a predetermined last sector number of the block.

To achieve the above and/or other aspects of the present invention, there is provided a block synchronization detection method in a system having a decoder that decodes an error correction code (ECC) in units of blocks having a plurality of sectors, the method comprising: performing an operation on a predetermined last sector number, an n-th sector number, and an (n−1)-th sector number contained in a block; setting a comparison relation between a result of the operation and a predetermined threshold value depending on whether sector numbers contained in the block are sequentially increasing or decreasing; comparing a result of the operation with the predetermined threshold value according to the set comparison result; and outputting a result of the comparison as a block synchronization signal.

The performing an operation comprises subtracting the (n−1)-th sector number from the predetermined last sector number and adding the n-th sector number to a result of the subtraction.

The setting of a comparison relation includes: when the sector numbers are sequentially increasing, setting the comparison relation to compare whether the result of the operation is smaller than a first predetermined threshold value, and when the sector numbers are sequentially decreasing, setting the comparison relation to compare whether the result of the operation is greater than a second predetermined threshold value.

The first and second predetermined threshold values are different values.

The first and second predetermined threshold values are set to determine block synchronization when errors occur in a sector in which block synchronization is to be detected and in a plurality of the sector numbers adjacent to the sector in which block synchronization is to be detected.

The first and second predetermined threshold values are set to determine block synchronization when a first sector number for the block is not detected.

To achieve the above and/or other aspects according to the present invention, there is provided a block synchronization detection apparatus for a device having a decoder that decodes an error correction code (ECC) in units of blocks, each block having a plurality of sectors, the apparatus comprising: a delay unit receiving an n-th sector number, delaying transmission of the n-th sector number for one sector duration, and outputting an (n−1)-th sector number; a first block synchronization detection unit performing an operation using a last sector number, the n-th sector number, and the (n−1)-th sector number, and determining, when sector numbers contained in a block are sequentially increasing, whether a result of the operation is less than a first predetermined threshold value, and outputting a first result of the determination; a second block synchronization detection unit performing the operation using the last sector number, the n-th sector number, and the (n−1)-th sector number, and determining, when the sector numbers contained in the block are sequentially decreasing, whether a result of the operation is greater than a second predetermined threshold value, and outputting a second result of the determination; and a multiplexer receiving the first result and the second result and selectively transmitting the first result or the second result as a block synchronization signal depending on whether the sector numbers are increasing or decreasing.

To achieve the above and/or other aspects according to the present invention, there is provided a block synchronization detection apparatus in a system having a decoder that decodes an error correction code (ECC) in units of blocks comprising a plurality of sectors, the apparatus including an operator performing an operation on a predetermined last sector number, an n-th sector number, and an (n−1)-th sector number contained in a block, based on a predetermined operation relation; and a comparator comparing a result of the operation output from the operator with a predetermined threshold value and outputting the result of the comparison as a block synchronization signal, the block synchronization signal being used to discriminate one ECC block from another ECC block when a first sector of the one ECC block is not detected.

These, together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the invention will become apparent and more readily appreciated from the following description of the preferred embodiments, taken in conjunction with the accompanying drawings, of which:

FIG. 5A shows an example of block synchronization according to the present invention and a conventional method when the sector number is normally detected in a system in which one ECC block includes 32 sectors with each sector number increasing by 2;

FIG. 5B shows an example of block synchronization according to the present invention and a conventional method when the sector number is abnormally detected in a system in which one ECC block includes 32 sectors with each sector number increasing by 2;

FIG. 6A shows an example of block synchronization according to the present invention and a conventional method when the sector number is normally detected in a system in which one ECC block includes 32 sectors with each sector number decreasing by 2;

FIG. 6B shows an example of block synchronization according to the present invention and a conventional method when the sector number is abnormally detected in a system in which one ECC block includes 32 sectors with each sector number decreasing by 2; and FIG. 7 is a flowchart illustrating a block synchronization detection method according to the embodiment of the present invention.

DETAILED DESCRIPTION OF THE PREFERRED EMBODIMENT

Figure 1:
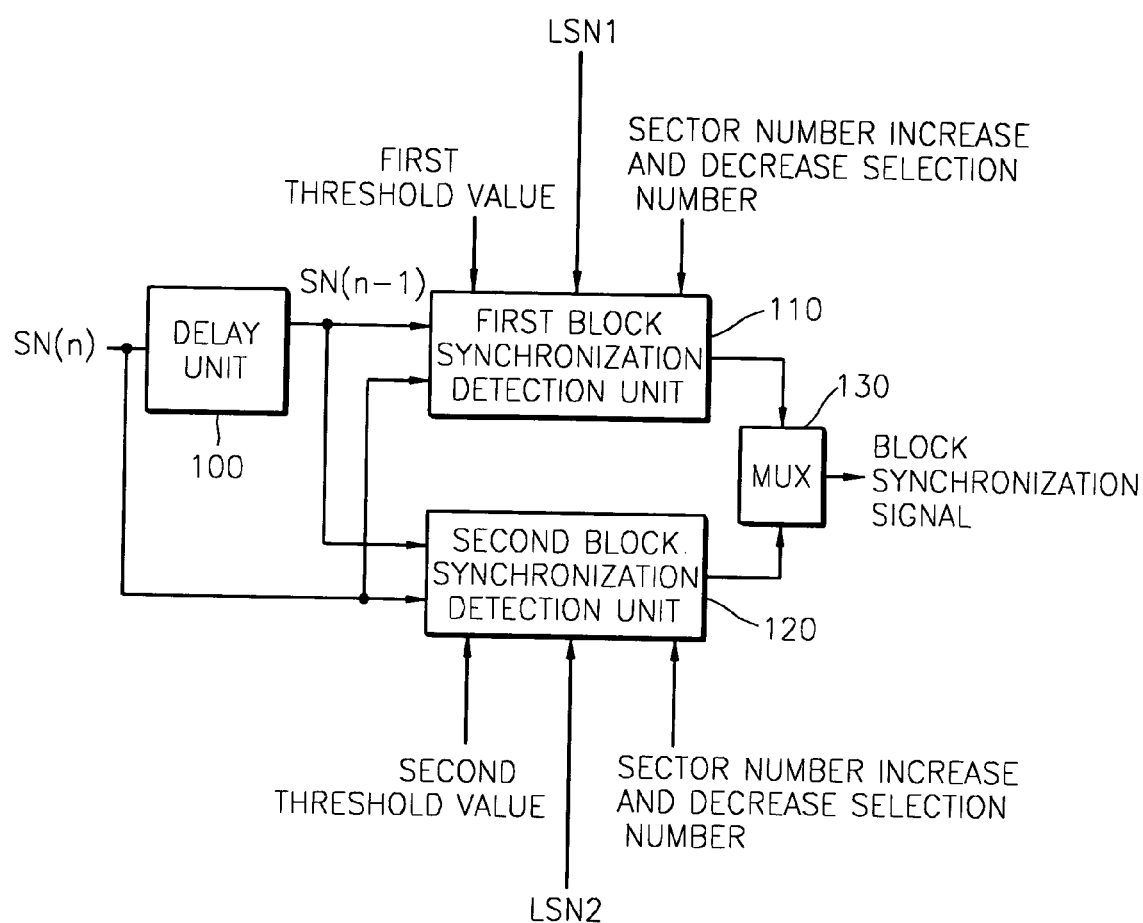
FIG. 1 is a block diagram illustrating a block synchronization detection apparatus according to an embodiment of the present invention.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

FIG. 1 is a block diagram illustrating a block synchronization detection apparatus according to an embodiment of the present invention. Referring to FIG. 1, the block synchronization detection apparatus includes a delay unit 100, a first block synchronization detection unit 110, a second block synchronization detection unit 120, and a multiplexer MUX 130. The block synchronization detection apparatus may be included in a decoder for decoding an error correction code (ECC) in units of ECC blocks.

The delay unit 100 delays transmission of input sector numbers for one sector duration. Thus, when an n-th sector number SN(n) is input, an (n−1)-th sector number SN(n−1) is output. The n-th sector number SN(n) and the (n−1)-th sector number SN(n−1) are detected by an ID detection unit (not shown) of the decoder. The ID detection unit detects an identification information ID from the input data.

When the sector numbers contained in an ECC block are sequentially increased, the first block synchronization detection unit 110 detects block synchronization for the input data using the n-th sector number SN(n), the (n−1)-th sector number SN(n−1) transmitted from the delay unit 100, an externally-input last sector number LSN, a first threshold value, and a sector number increase and decrease selection signal. The last sector number LSN is preset. For example, when one ECC block includes 16 sectors and the sector numbers are sequentially increased from 0 to 15, the last sector number LSN is preset to 15.

Figure 2:
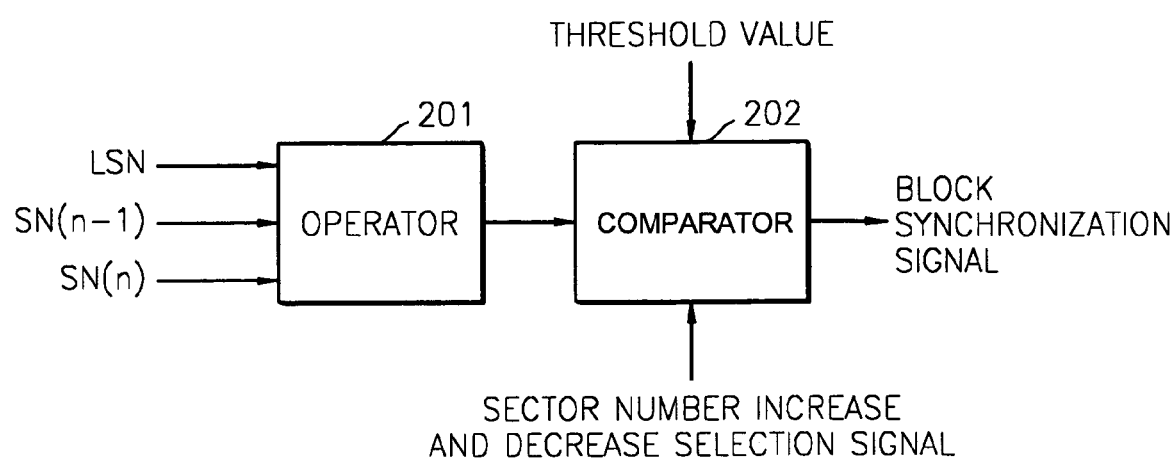
FIG. 2 is a block diagram illustrating first and second block synchronization detection units shown in FIG. 1.

The first block synchronization detection unit 110 includes an operator 201 and a comparator 202, as shown in FIG. 2.

To detect block synchronization, the operator 201 performs an operation using the last sector number LSN, the n-th sector number SN(n), and the (n−1)-th sector number SN(n−1), as shown in the following equation.

LSN−SN(n−1)+SN(n)

The result of the operation is provided to the comparator 202, which outputs information regarding whether block synchronization has been detected. The comparator 202 compares whether the result of the operation output from the operator 201 is smaller than an input threshold value. The comparator 202 operates in the first block synchronization detection unit 110 when the sector number increase and decrease selection signal indicates increasing sector numbers. For example, if a "1" indicates that the sector numbers are increasing, the comparator 202 operates when the sector number increase and decrease selection signal is input as "1."

Thus, the first block synchronization detection unit 110 operates when the sector numbers in the ECC block are increasing. In this case, the threshold value input into the comparator 202 is the first threshold value shown in FIG. 1. The first threshold value and the sector number increase and decrease selection signal may be provided from a system control unit (not shown).

The first threshold value is set by considering conditions in which block synchronization can be detected, even when errors occur in a plurality of adjacent sector numbers including a first sector of the ECC block.

The second block synchronization detection unit 120 has the same structure as that of the first block synchronization detection unit 110. However, the second block synchronization detection unit 120 operates when the sector numbers contained in one ECC block are decreasing. Thus, an externally-input last sector number LSN, a second threshold value, and a sector number increase and decrease selection signal have values different from those input into the first block synchronization detection unit 110. For example, when one ECC block includes 16 sectors and the sector numbers are sequentially decreased from 15 to 0, the last sector number LSN is preset to 0.

Also, the second threshold value is set to satisfy the same conditions as those of the first threshold value. However, the first block synchronization detection unit 110 is used when the sector numbers are increasing, and the second block synchronization detection unit 120 is used when the sector numbers are decreasing. Thus, the first and second threshold values differ from one another. For example, when one ECC block includes 16 sectors, the first threshold value may be set to 3 or 5, while the second threshold value may be set to "10" or "12." The first and second threshold values are also set by considering the reproduction characteristics of a medium for providing data. For example, the first and second threshold values may be set depending on whether the medium is a DVD, a blu-ray disc (BD), or a CD.

The second block synchronization detection unit 120 may include the operator 201 and the comparator 202, as shown in FIG. 2. In this case, the threshold value of FIG. 2 is the second threshold value shown in FIG. 1, and the sector number increase and decrease selection signal is set to "0" to discriminate the sector number increase and decrease selection signal from that of the first block synchronization detection unit 110.

The multiplexer MUX 130 selectively transmits block synchronization signals, each of which is output from the first block synchronization detection unit 110 and the second block synchronization detection unit 120. The operation of the multiplexer 130 is controlled in response to the sector number increase and decrease selection signal.

According to one aspect of the present invention, the block synchronization detection apparatus may not include the multiplexer 130 MUX of FIG. 1, and may directly transmit each of the block synchronization signals output from the first block synchronization detection unit 110 and the second block synchronization detection unit 120.

When the block synchronization detection apparatus according to the present invention is applied to a system in which one ECC block includes 16 sectors and the sector numbers in the ECC block are increasing, the results of block synchronization detection may be obtained as shown in Table 1, which shows examples of abnormal detections of sector numbers, based on a correlation between an (n−1)-th sector number (i.e., the preceding sector number), an n-th sector number (i.e., the present sector number), a last sector number LSN, and a threshold value. Table 1 shows an example of block synchronization detection when the threshold value is set to "3" and "5."

For example, in the first row of block synchronization detection results in Table 1, the (n−1)-th sector number is 12 and the n-th sector number is 14. Because the detection of sector number 12 is followed by a clock period extension, sector number 14 is detected rather than sector number 13. For a threshold value of 3, the result of the equation above is compared with the threshold value of 3. If the result of the equation is greater than or equal to 3, the block synchronization detection value becomes "0," indicating block synchronization has not been detected. If the result of the equation is less than 3, the block synchronization detection value becomes "1," indicating block synchronization has been detected.

TABLE 1

| LSN | Sector number | | Block synchronization | |
|-----|---|---|---|---|
| | n − 1 | n | Threshold value = 3 | Threshold value = 5 |
| 15 | 12 | 14 | 0 | 0 |
| | 12 | 15 | 0 | 0 |
| | 12 | 0 | 0 | 1 |
| | 12 | 1 | 0 | 1 |
| | 13 | 0 | 1 | 1 |
| | 13 | 1 | 0 | 1 |
| | 13 | 2 | 0 | 1 |
| | 13 | 3 | 0 | 0 |
| | 13 | 4 | 0 | 0 |
| | 14 | 0 | 1 | 1 |
| | 14 | 1 | 1 | 1 |
| | 14 | 2 | 0 | 1 |
| | 14 | 3 | 0 | 1 |
| | 15 | 0 | 1 | 1 |
| | 15 | 1 | 1 | 1 |
| | 15 | 2 | 1 | 1 |
| | 15 | 3 | 0 | 1 |
| | 15 | 4 | 0 | 1 |

Figure 3A:
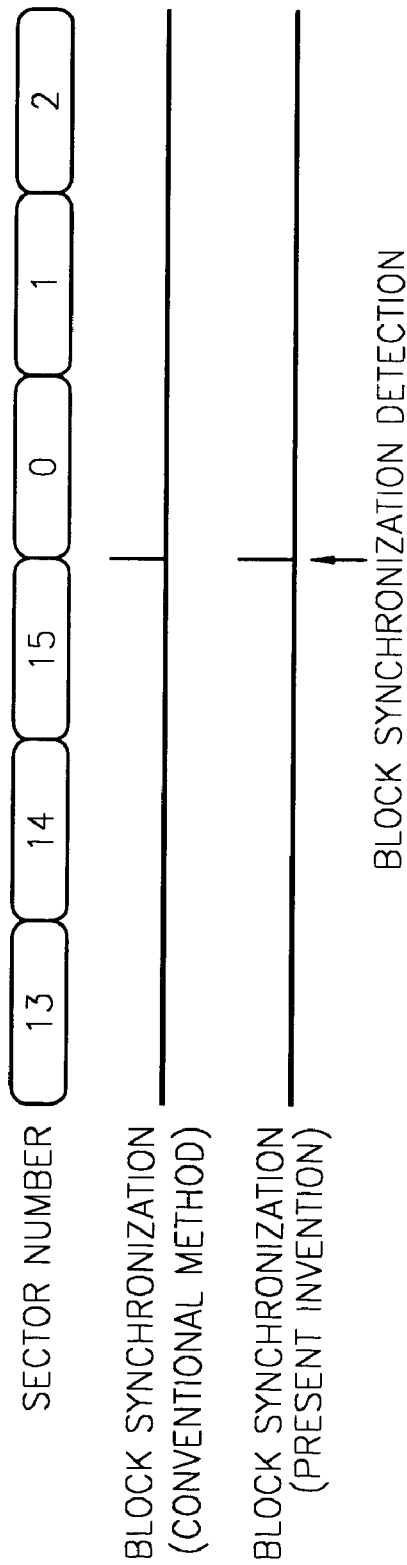
FIG. 3A shows an example of block synchronization detection according to the present invention and a conventional method when a sector number is normally detected in a system in which one ECC block includes 16 sectors with sequentially increasing sector numbers.
Figure 3B:
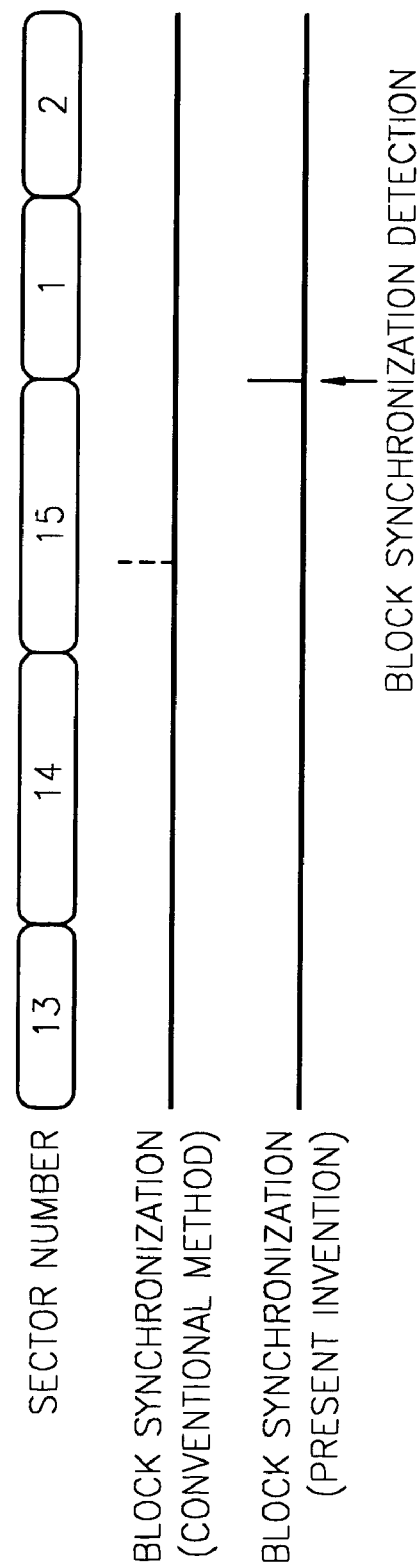
FIG. 3B shows an example of block synchronization according to the present invention and a conventional method when the sector number is abnormally detected in a system in which one ECC block includes 16 sectors with sequentially increasing sector numbers.

FIGS. 3A and 3B show timing diagrams for the block synchronization detection results shown in Table 1. That is, FIG. 3A shows an example of block synchronization detection according to the present invention and a conventional method when a sector number is normally detected in a system in which one ECC block includes 16 sectors and the sector numbers are sequentially increasing, and FIG. 3B shows an example of block synchronization according to the present invention and a conventional method when the sector number is abnormally detected in a system in which one ECC block includes 16 sectors and the sector numbers are sequentially increasing. In FIG. 3B (as well as FIGS. 4B, 5B, and 6B described below), block synchronization cannot be detected using the conventional method when the sector number is abnormally detected. The dashed lines in FIGS. 3B, 4B, 5B, and 6B indicate the position where block synchronization must be detected. The solid lines in FIGS. 3B, 4B, 5B, and 6B indicate the position where block synchronization is detected according to the present invention.

In addition, when the block synchronization detection apparatus according to the present invention is used in a system in which one ECC block includes 16 sectors and the sector numbers in the ECC block are decreasing, the results of block synchronization detection may be obtained as shown in Table 2, based on a correlation between the (n−1)-th sector number, the n-th sector number, the last sector number LSN, and the threshold value. Table 2 shows an example of block synchronization detection when the threshold value is set to "12" and "10."

TABLE 2

| LSN | Sector number | | Block synchronization | |
|-----|---|---|---|---|
| | n − 1 | n | Threshold value = 12 | Threshold value = 10 |
| 0 | 3 | 15 | 0 | 1 |
| | 3 | 14 | 0 | 1 |
| | 3 | 13 | 0 | 0 |
| | 3 | 12 | 0 | 0 |
| | 3 | 11 | 0 | 0 |
| | 2 | 1 | 0 | 0 |
| | 2 | 0 | 0 | 0 |
| | 2 | 15 | 1 | 1 |
| | 2 | 14 | 0 | 1 |
| | 2 | 13 | 0 | 1 |
| | 1 | 0 | 0 | 0 |
| | 1 | 15 | 1 | 1 |
| | 1 | 14 | 1 | 1 |
| | 1 | 13 | 0 | 1 |
| | 1 | 12 | 0 | 1 |
| | 0 | 15 | 1 | 1 |
| | 0 | 14 | 1 | 1 |
| | 0 | 13 | 1 | 1 |
| | 0 | 12 | 0 | 1 |
| | 0 | 11 | 0 | 1 |

Figure 4A:
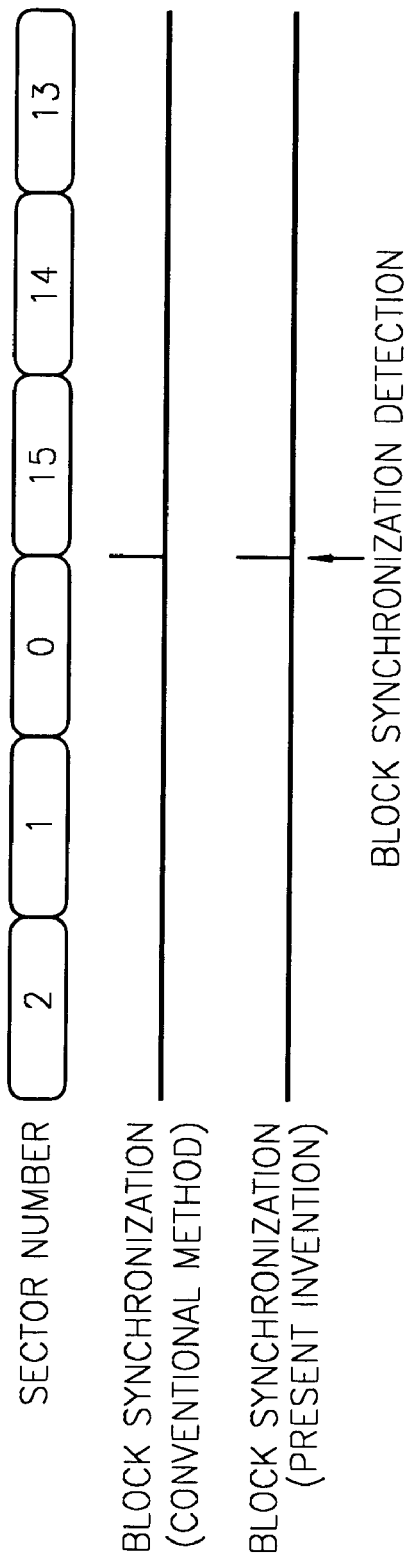
FIG. 4A shows an example of block synchronization according to the present invention and a conventional method when the sector number is normally detected in a system in which one ECC block includes 16 sectors with sequentially decreasing sector numbers.
Figure 4B:
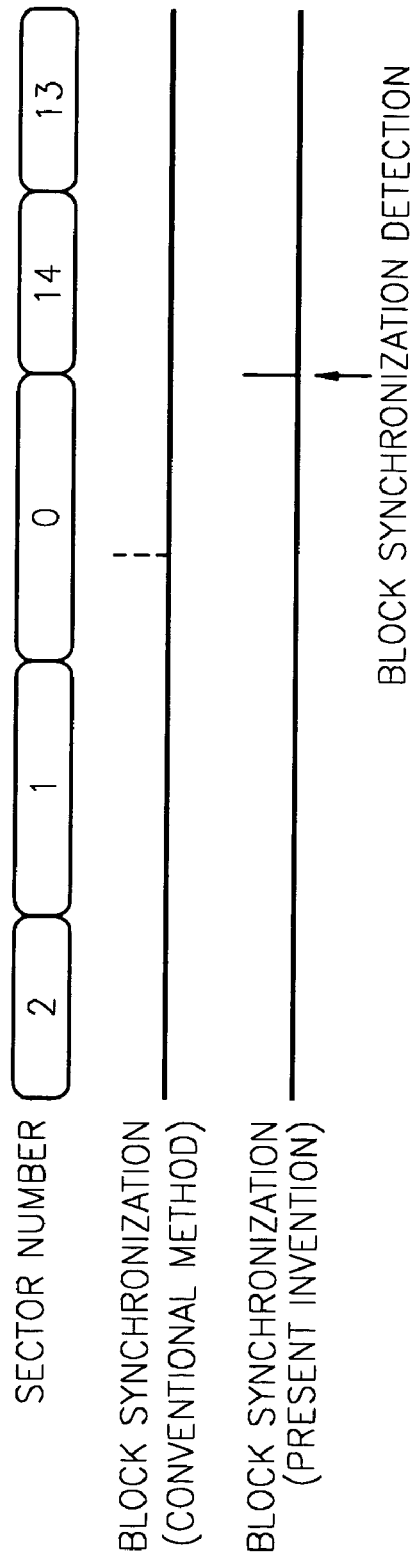
FIG. 4B shows an example of block synchronization according to the present invention and a conventional method when the sector number is abnormally detected in a system in which one ECC block includes 16 sectors with sequentially decreasing sector numbers.

FIGS. 4A and 4B show timing diagrams for the block synchronization detection results shown in Table 2. That is, FIG. 4A shows an example of block synchronization according to the present invention and a conventional method when the sector number is normally detected in a system in which one ECC block includes 16 sectors and the sector numbers are sequentially decreasing, and FIG. 4B shows an example of block synchronization according to the present invention and a conventional method when the sector number is abnormally detected in a system in which one ECC block includes 16 sectors and the sector numbers are sequentially decreasing.

When the block synchronization detection apparatus according to the present invention is applied to a BD in which sector numbers are increasing by 2, the results of block synchronization detection may be obtained as shown in Table 3. Table 3 shows an example of block synchronization detection when the threshold value is set to "6" and "10."

TABLE 3

| LSN | Sector number | | Block synchronization | |
|---|---|---|---|---|
| | | | Threshold | Threshold |
| 30 | n − 1 | n | value = 6 | value = 10 |
| | 24 | 28 | 0 | 0 |
| | 24 | 30 | 0 | 0 |
| | 24 | 0 | 0 | 1 |
| | 24 | 2 | 0 | 1 |
| | 26 | 28 | 0 | 0 |
| | 26 | 30 | 0 | 0 |
| | 26 | 0 | 1 | 1 |
| | 26 | 2 | 0 | 1 |
| | 26 | 4 | 0 | 1 |
| | 28 | 0 | 1 | 1 |
| | 28 | 2 | 1 | 1 |
| | 28 | 4 | 0 | 1 |
| | 28 | 6 | 0 | 1 |
| | 30 | 0 | 1 | 1 |
| | 30 | 2 | 1 | 1 |
| | 30 | 4 | 1 | 1 |
| | 30 | 6 | 0 | 1 |
| | 30 | 8 | 0 | 1 |

FIGS. 5A and 5B show timing diagrams for the block synchronization detection results shown in Table 3. That is, FIG. 5A shows an example of block synchronization detection according to the present invention and a conventional method when the sector number is normally detected in a system in which one ECC block includes 32 sectors and the sector numbers are increasing by 2, and FIG. 5B shows an example of block synchronization detection according to the present invention and a conventional method when the sector number is abnormally detected in a system in which one ECC block includes 32 sectors and the sector numbers are increasing by 2.

When the block synchronization detection apparatus according to the present invention is applied to a BD in which sector numbers are decreasing by 2, the results of block synchronization detection may be obtained as shown in Table 4. Table 4 shows an example of block synchronization detection when the threshold value is set to "24" and "20."

TABLE 4

| LSN | Sector number | | Block synchronization | |
|---|---|---|---|---|
| | | | Threshold | Threshold |
| 0 | n − 1 | n | value = 24 | value = 20 |
| | 6 | 0 | 0 | 0 |
| | 6 | 30 | 0 | 1 |
| | 6 | 28 | 0 | 1 |
| | 6 | 26 | 0 | 0 |
| | 6 | 24 | 0 | 0 |
| | 4 | 0 | 0 | 0 |
| | 4 | 30 | 1 | 1 |
| | 4 | 28 | 0 | 1 |
| | 4 | 26 | 0 | 1 |
| | 4 | 24 | 0 | 0 |
| | 2 | 0 | 0 | 0 |
| | 2 | 30 | 1 | 1 |
| | 2 | 28 | 1 | 1 |
| | 2 | 26 | 0 | 1 |
| | 2 | 24 | 0 | 1 |
| | 0 | 30 | 1 | 1 |

TABLE 4-continued

| LSN | Sector number | | Block synchronization | |
|---|---|---|---|---|
| | | | Threshold | Threshold |
| 0 | n − 1 | n | value = 24 | value = 20 |
| | 0 | 28 | 1 | 1 |
| | 0 | 26 | 1 | 1 |
| | 0 | 24 | 0 | 1 |
| | 0 | 22 | 0 | 1 |

FIGS. 6A and 6B show timing diagrams for the block synchronization detection results shown in Table 4. That is, FIG. 6A shows an example of block synchronization detection according to the present invention and a conventional method when the sector number is normally detected in a system in which one ECC block includes 32 sectors and the sector numbers are decreasing by 2, and FIG. 6B shows an example of block synchronization according to the present invention and a conventional method when the sector number is abnormally detected in a system in which one ECC block includes 32 sectors and the sector numbers are decreasing by 2.

The threshold values shown in Tables 1 through 4 may be varied according to the operational conditions of the corresponding system.

In the above embodiment, the block synchronization detection apparatus includes both the first block synchronization detection unit 110 and the second block synchronization detection unit 120. However, one block synchronization detection unit may be used to perform all of the functions of the first block synchronization detection unit 110 and the second block synchronization detection unit 120. In this case, the block synchronization detection unit is structured as shown in FIG. 2 with the comparator 202 setting a comparison relation between the results of an operation transmitted from the operator 201 in response to the input sector number increase and decrease selection signal and the threshold value and comparing the result of the operation to the threshold value. That is, when the applied sector number increase and decrease selection signal indicates that the sector numbers are increasing, the comparator 202 sets a comparison relation to compare whether the result of the operation is smaller than the threshold value. On the other hand, when the applied sector number increase and decrease selection signal indicates that the sector numbers are decreasing, the comparator 202 sets a comparison relation to compare whether the result of the operation is greater than the threshold value.

FIG. 7 is a flowchart illustrating a block synchronization detection method according to the embodiment of the present invention.

An operation on the n-th sector number SN(n), the (n−1)-th sector number SN(n−1), and the last sector number LSN is performed at 701 according to the equation above. The last sector number LSN is preset according to the specification of an ECC block to be processed.

A comparison relation between the result of the operation and the predetermined threshold value is set at 702 depending on whether the sector numbers in the ECC block are sequentially increasing or decreasing. That is, when the sector numbers are sequentially increasing, the comparison relation is set to compare whether the result of the operation is smaller than the predetermined threshold value. On the other hand, when the sector numbers are sequentially decreasing, the comparison relation is set to compare whether the result of the operation is greater than the predetermined threshold value.

The threshold value used when the sector numbers are sequentially increasing and the threshold value used when the sector numbers are sequentially decreasing are different, as described above in relation to FIGS. 1 and 2. The threshold value is obtained by considering conditions in which block synchronization can be detected even when errors occur in a sector number in which block synchronization is to be detected, and in at least one adjacent sector number, as described above in relation to FIGS. 1 and 2. That is, even when a first sector number in the ECC block is not detected, the threshold value is obtained by considering conditions in which block synchronization can be detected.

The result of the operation is compared at 703 with the predetermined threshold value based on the comparison relation set at 702. At 704, the result of the comparison is output as a block synchronization signal. That is, when the sector numbers are sequentially increasing, if the result of the operation is smaller than the threshold value, a signal indicating block synchronization detection is output. On the other hand, when the sector numbers are sequentially decreasing, if the result of the operation is greater than the threshold value, a signal indicating block synchronization is output.

As described above, the block synchronization detection apparatus and method according to the present invention can detect block synchronization for discriminating one ECC block from another, even when, due to defects of input data or other reasons, a first sector of an ECC block is not detected in a system having a decoder for decoding an ECC in units of ECC blocks. Thus, a buffer memory for storing data in units of ECC blocks can be easily controlled, and a phenomenon in which error correction in units of ECC blocks is not performed because block synchronization is not detected can be prevented.

Although an embodiment of the present invention has been shown and described, it will be appreciated by those skilled in the art that changes may be made in this embodiment without departing from the principles and spirit of the invention, the scope of which is defined in the claims and their equivalents.

What is claimed is:

1. A block synchronization detection apparatus in a system having a decoder that decodes an error correction code (ECC) in units of blocks comprising a plurality of sectors, the apparatus comprising:
   an operator performing an operation on a predetermined last sector number, an n-th sector number, and an (n−1)-th sector number contained in a block, based on a predetermined operation relation; and
   a comparator comparing a result of the operation output from the operator with a predetermined threshold value and outputting the result of the comparison as a block synchronization signal,
   wherein n is zero or a natural number.

2. The apparatus of claim 1, wherein the comparator compares the result of the operation with the predetermined threshold value based on a comparison relation set depending on whether sector numbers contained in the block are sequentially increasing or decreasing.

3. The apparatus of claim 1, wherein:
   the sector numbers contained in the block are sequentially increasing; and
   the comparator determines whether the result of the operation is smaller than a predetermined threshold value.

4. The apparatus of claim 1, wherein the operation performed by the operator subtracts the (n−1)-th sector number from the predetermined last sector number, adds the n-th sector number to a result of the subtraction, and outputs a result of the addition.

5. The apparatus of claim 1, further comprising a delay unit that delays the (n−1)-th sector number for one sector duration before providing the (n−1)-th sector number to the operator.

6. The apparatus of claim 1, wherein the predetermined threshold value is set to determine block synchronization when errors occur in a plurality of the sector numbers.

7. The apparatus of claim 1, wherein the predetermined threshold value is set to determine block synchronization when a first sector number for the block is not detected.

8. The apparatus of claim 1, wherein:
   the sector numbers contained in the block are sequentially decreasing; and
   the comparator determines whether the result of the operation is greater than a predetermined threshold value.

9. A block synchronization detection apparatus in a system having a decoder that decodes an error correction code (ECC) in units of blocks having a plurality of sectors, the apparatus comprising:
   a first block synchronization detection unit that, when sector numbers contained in a block are sequentially increasing, determines whether a result of an operation using a plurality of the sector numbers contained in the block is smaller than a first predetermined threshold value, and outputs a result of the determination as a block synchronization signal; and
   a second block synchronization detection unit that, when the sector numbers contained in the block are sequentially decreasing, determines whether a result of an operation using a plurality of the sector numbers contained in the block is greater than a second predetermined threshold value, and outputs a result of the determination as a block synchronization signal.

10. The apparatus of claim 9, wherein the first and second predetermined threshold values are set to determine block synchronization when errors occur in a sector in which block synchronization is to be detected and in a plurality of the sector numbers adjacent to the sector in which block synchronization is to be detected.

11. The apparatus of claim 9, wherein the first and second predetermined threshold values are set to determine block synchronization when a first sector number for the block is not detected.

12. The apparatus of claim 9, further comprising a delay unit that delays input of one of the sector numbers for one sector duration.

13. The apparatus of claim 12, wherein the plurality of sector numbers contained in the block comprise an n-th sector number, a (n−1)-th sector number provided by the delay unit, and a predetermined last sector number of the block,
   wherein n is zero or a natural number.

14. A block synchronization detection method in a system having a decoder that decodes an error correction code (ECC) in units of blocks having a plurality of sectors, the method comprising:

performing an operation on a predetermined last sector number, an n-th sector number, and an (n−1)-th sector number contained in a block;

setting a comparison relation between a result of the operation and a predetermined threshold value depending on whether sector numbers contained in the block are sequentially increasing or decreasing;

comparing a result of the operation with the predetermined threshold value according to the set comparison result; and outputting a result of the comparison as a block synchronization signal, wherein n is zero or a natural number.

15. The method of claim 14, wherein said performing an operation comprises subtracting the (n−1)-th sector number from the predetermined last sector number and adding the n-th sector number to a result of the subtraction.

16. The method of claim 14, wherein said setting a comparison relation comprises:

when the sector numbers are sequentially increasing, setting the comparison relation to compare whether the result of the operation is smaller than a first predetermined threshold value; and when the sector numbers are sequentially decreasing, setting the comparison relation to compare whether the result of the operation is greater than a second predetermined threshold value.

17. The method of claim 16, wherein the first and second predetermined threshold values are different values.

18. The method of claim 14, wherein the first and second predetermined threshold values are set to determine block synchronization when errors occur in a sector in which block synchronization is to be detected and in a plurality of the sector numbers adjacent to the sector in which block synchronization is to be detected.

19. The method of claim 14, wherein the first and second predetermined threshold values are set to determine block synchronization when a first sector number for the block is not detected.

20. A block synchronization detection apparatus for a device having a decoder that decodes an error correction code (ECC) in units of blocks, each block having a plurality of sectors, the apparatus comprising:

a delay unit receiving an n-th sector number, delaying transmission of the n-th sector number for one sector duration, and outputting an (n−1)-th sector number;

a first block synchronization detection unit performing an operation using a last sector number, the n-th sector number, and the (n-1)-th sector number, and determining, when sector numbers contained in a block are sequentially increasing, whether a result of the operation is less than a first predetermined threshold value, and outputting a first result of the determination;

a second block synchronization detection unit performing the operation using the last sector number, the n-th sector number, and the (n-1)-th sector number, and determining, when the sector numbers contained in the block are sequentially decreasing, whether a result of the operation is greater than a second predetermined threshold value, and outputting a second result of the determination; and a multiplexer receiving the first result and the second result and selectively transmitting the first result or the second result as a block synchronization signal depending on whether the sector numbers are increasing or decreasing, wherein n is zero or a natural number.

21. The apparatus of claim 20, wherein the first and second predetermined threshold values are set to determine block synchronization when errors occur in a sector in which block synchronization is to be detected and in a plurality of the sector numbers adjacent to the sector in which block synchronization is to be detected.

22. The apparatus of claim 20, wherein the first and second predetermined threshold values are set to determine block synchronization when a first sector number for the block is not detected.

23. The apparatus of claim 20, wherein the first block synchronization detection unit comprises:

an operator performing the operation; and a comparator comparing the result of the operation with the first predetermined threshold value.

24. The apparatus of claim 20, wherein the second block synchronization detection unit comprises:

an operator performing the operation; and a comparator comparing the result of the operation with the second predetermined threshold value.

25. The apparatus of claim 23, wherein the operation performed by the operator subtracts the (n−1)-th sector number from the predetermined last sector number, adds the n-th sector number to a result of the subtraction, and outputs a result of the addition.

26. A block synchronization detection apparatus in a system having a decoder that decodes an error correction code (ECC) in units of blocks comprising a plurality of sectors, the apparatus comprising:

an operator performing an operation on a predetermined last sector number, an n-th sector number, and an (n−1)-th sector number contained in a block, based on a predetermined operation relation; and a comparator comparing a result of the operation output from the operator with a predetermined threshold value and outputting the result of the comparison as a block synchronization signal, the block synchronization signal being used to discriminate one ECC block from another ECC block when a first sector of the one ECC block is not detected, wherein n is zero or a natural number.

* * * * *

UNITED STATES PATENT AND TRADEMARK OFFICE
CERTIFICATE OF CORRECTION

| | |
|---|---|
| PATENT NO. | : 7,137,058 B2 |
| APPLICATION NO. | : 10/635000 |
| DATED | : November 14, 2006 |
| INVENTOR(S) | : Woo-sik Eom |

It is certified that error appears in the above-identified patent and that said Letters Patent is hereby corrected as shown below:

On Title Page, Item (75), change "Gyeonggi-dol" to --Gyeonggi-do--.

Column 12, Line 60, change "a (n-1)-th" to --an (n-1)-th--.

Signed and Sealed this

Thirteenth Day of March, 2007

JON W. DUDAS
*Director of the United States Patent and Trademark Office*